United States Patent [19]
Hotta et al.

[11] Patent Number: 5,521,371
[45] Date of Patent: May 28, 1996

[54] REWRITABLE BAR CODE DISPLAY MEDIUM, AND IMAGE DISPLAY METHOD AND IMAGE DISPLAY APPARATUS USING THE SAME

[75] Inventors: Yoshihiko Hotta, Mishima; Keishi Kubo; Shoji Maruyama, both of Yokohama; Takashi Yano; Hajime Takayama, both of Tokyo, all of Japan

[73] Assignee: Ricoh Company, Ltd., Tokyo, Japan

[21] Appl. No.: 364,381

[22] Filed: Dec. 23, 1994

Related U.S. Application Data

[60] Continuation of Ser. No. 138,981, Oct. 21, 1993, abandoned, which is a division of Ser. No. 726,210, Jul. 5, 1991, Pat. No. 5,298,476.

[30] Foreign Application Priority Data

Jul. 6, 1990 [JP] Japan ................................ 2-179354
Jun. 19, 1991 [JP] Japan ................................ 3-174433

[51] Int. Cl.⁶ ............................................ G06K 19/00
[52] U.S. Cl. ........................ 235/487; 235/462; 235/494
[58] Field of Search ............................ 235/462, 487, 235/494, 385, 380; 503/201, 227

[56] References Cited

U.S. PATENT DOCUMENTS

| | | | |
|---|---|---|---|
| 4,544,834 | 10/1985 | Newport et al. | 235/487 |
| 4,728,177 | 3/1988 | Green | 235/382.5 |
| 4,837,071 | 6/1989 | Tagoku et al. | |
| 4,917,948 | 4/1990 | Hotta . | |
| 5,017,421 | 5/1991 | Hotta et al. . | |
| 5,085,934 | 2/1992 | Hotta et al. . | |
| 5,108,980 | 4/1992 | Hotta et al. . | |
| 5,109,153 | 4/1992 | Johnsen et al. | 235/468 |
| 5,158,924 | 10/1992 | Konagaya et al. . | |
| 5,158,926 | 10/1992 | Hotta et al. . | |
| 5,219,820 | 6/1993 | Morohoshi et al. . | |
| 5,260,254 | 11/1993 | Hotta et al. | 503/201 |
| 5,283,220 | 2/1994 | Kawaguchi et al. . | |

FOREIGN PATENT DOCUMENTS

| | | | |
|---|---|---|---|
| 61-70680 | 4/1986 | Japan | 235/487 |
| 1-72894 | 3/1989 | Japan | 503/227 |
| 2-2472 | 1/1990 | Japan | 235/462 |

*Primary Examiner*—Donald T. Hajec
*Assistant Examiner*—Karl Frech
*Attorney, Agent, or Firm*—Oblon, Spivak, McClelland, Maier & Neustadt

[57] ABSTRACT

A rewritable bar code display medium is disclosed, which is composed of a support and a reversible thermosensitive recording layer for reversibly forming bar codes therein formed on the support, which reversible thermosensitive recording layer varies in transparency with change in temperature, and an image display method using the rewritable bar code display medium, and an apparatus for implementing the image display method are also disclosed.

8 Claims, 2 Drawing Sheets

REWRITABLE BAR CODE DISPLAY MEDIUM, AND IMAGE DISPLAY METHOD AND IMAGE DISPLAY APPARATUS USING THE SAME

This application is a Continuation of application Ser. No. 08/138,981, filed on Oct. 21, 1993, now abandoned, which was a Division of application Ser. No. 07/726,210, filed on Jul. 5, 1991, now U.S. Pat. No. 5,298,476.

BACKGROUND OF THE INVENTION

1. Field of the Invention

The present invention relates to a rewritable bar code display medium, an image display method using the rewritable bar code display medium, and an apparatus for implementing the image display method.

The bar code display medium of the present invention can form a bar code thereon, which bar code includes a two-dimensional bar code for general use, and other optical recognition patterns represented by an optical character recognition (OCR) pattern or a code consisting of four distinguishable areas, capable of representing sixteen different types of information in total.

2. Discussion of Background

Bar code display is widely applied to the point of sale (POS) system. There are two methods for bar code displaying for commercial products in the POS system. One is a so-called source marking method, in which a commercial code is printed in the form of a bar code and attached to each commercial product by the manufacturer in advance, and the other method is a so-called in-store marking method in which a commercial code is printed in the form of a bar code and attached to each commercial product at the retail sale stage. The bar codes of this kind for this method can be printed with high accuracy, but are not suitable when the manufacturer produces a wide variety of products, each in a small amount. The in-store marking method is particularly used for perishable foods in ordinary stores, and for controlling a variety of automobile parts in the factories of automobiles.

To print a bar code for use in the above-mentioned in-store marking method, a thermosensitive recording paper or a thermal image transfer ink ribbon is generally used as described in "Automation Technology" Tanaka, vol. 17, 6, p.109 1985. The bar coded printed on such a conventional recording paper or by use of such an ink ribbon bar is not rewritable. Therefore, for instance, when the price of a commercial product is changed, there is no choice but remove the old bar code label and instead attach a new bar code label carrying updated information to the product, or attach a new bar code label over the old bar code label. Further, when the bar code is utilized for a control system, new information cannot be added to the original bar code at each process in the control system, although a new lot number may be added by using a new bar code label.

Furthermore, bar codes printed on a thermosensitive recording paper are so poor in durability that they fade when exposed to ultraviolet light and chemicals. Furthermore, since the surface of the thermosensitive recording paper is generally rough, the boundaries between printed bar code image areas and non-image areas (background) are not so sharp that it is extremely difficult to form bar code images with high accuracy and high resolution.

In the case where a bar code image is thermally transferred to an image-receiving sheet by using a thermal image transfer ink ribbon, it is difficult to uniformly transfer an ink layer of the thermal image transfer ink ribbon to the image-receiving sheet, so that the image density of printed bar codes becomes uneven particularly in the edge portions of the image areas or the ink is not transferred accurately imgewise, thus it is difficult to produce bar code images with high accuracy and high resolution.

As mentioned above, the conventional bar code images which are not produced by a printing method are not satisfactory with regard to the resolution, density, and accuracy because the boundaries between a bar code image area and a non-image area (background) are not clear cut. Therefore, such bar code images are not always read accurately by a bar code reader with sufficiently high reliability at present.

SUMMARY OF THE INVENTION

Accordingly, a first object of the present invention is to provide a rewritable bar code display medium free from the conventional shortcomings, capable of producing clear bar code images having high accuracy, high resolution, high density and high durability, with sharp boundaries between a bar code image area and a non-image area.

A second object of the present invention is to provide an image display method of forming bar code images in the above bar code display medium.

A third object of the present invention is to provide an image display apparatus for reading and erasing bar code images by use of the above bar code display medium.

A fourth object of the present invention is to provide an image display apparatus for forming, reading and erasing bar code images by use of the above bar code display medium.

The first object of the present invention is achieved by a rewritable bar code display medium comprising a support and a recording layer formed thereon which varies in transparency with change in temperature.

The second object of the present invention is achieved by an image display method of forming an image in a white opaque state or in a transparent state comprising the step of applying heat to a rewritable bar code display medium comprising a support and a recording layer formed thereon which is reversibly altered between a transparent state and a white opaque state with change in temperature and which comprises a resin matrix and an organic low-molecular-weight compound dispersed in the resin matrix.

The third object of the present invention is achieved by an image display apparatus comprising (a) a bar code reading means for optically reading a bar code formed on a rewritable bar code display medium comprising a support and a recording layer formed thereon which varies in transparency with change in temperature and which comprises a resin matrix and an organic low-molecular-weight compound dispersed in the resin matrix; and (b) a bar code erasing means for erasing the bar code formed on the bar code display medium with application of heat thereto.

The fourth object of the present invention is achieved by an image display apparatus comprising (a) a bar code forming means for forming in a white opaque state or in a transparent state a bar code on a rewritable bar code display medium with application of heat thereto, which comprises a support and a recording layer formed thereon which varies in transparency with change in temperature and which comprises a resin matrix and an organic low-molecular-weight compound dispersed in the resin matrix, (b) a bar code reading means for optically reading the bar code formed on the rewritable bar code display medium; and (c) a bar code erasing means for erasing the bar code formed on the bar code display medium with application of heat thereto.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The rewritable bar code display medium of the present invention comprises a support and a reversible thermosensitive recording layer (hereinafter referred to as a recording layer) formed thereon which varies in transparency with change in temperature. Namely, the recording layer is reversibly altered from a transparent state to a milky white opaque state, and vice versa, depending on the temperature of the recording layer.

In the present invention, as previously mentioned, any bar code display medium is usable, which can recognize, as information, optical changes such as changes in light intensity and changes in wavelength, regardless of whether or not the light employed is a visible light. Further, it is not necessarily required that the bar codes employed be understandable to the persons who use the codes, but it is required that the bar codes be detectable by some method.

The bar code display media according to the present invention will now be explained in detail by referring to FIGS. 1(a) and 1(b).

Figure 1A:
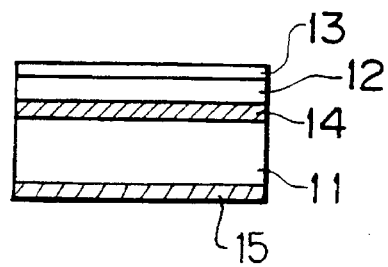
FIG. 1(a) is a schematic cross-sectional view of an example of a bar code display medium of the present invention.
Figure 1B:
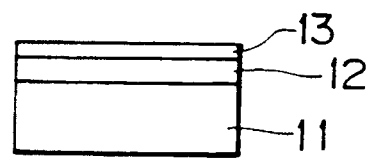
FIG. 1(b) is a schematic cross-sectional view of another example of a bar code display medium of the present invention.

FIG. 1(b) shows a schematic cross-sectional view of an example of a bar code display medium according to the present invention. FIG. 1(b) shows a schematic cross-sectional view of another example of the bar code display medium according to the present invention.

In these figures, reference numeral 11 indicates a support; reference numeral 12, a reversible thermosensitive recording layer (hereinafter recording layer); reference numeral 13, a protective layer; and reference numeral 14, a pigment layer or light-reflection layer. In the bar code display medium shown in FIG. 1(b), it is preferable that the support 11 be transparent.

In FIG. 1(a), the pigment layer or light-reflection layer 14 is interposed between the support 11 and the recording layer 12, whereby the contrast of the bar code image with the background is improved, so that the bar code image can be read with high accuracy. In particular, the light reflection layer is effective for improving the image contrast.

For the light reflection layer 14, any materials capable of reflecting the light can be employed. For example, metals such as Al, Sn, Au, Ag and Ni can be given, which are vacuum-deposited on the support as disclosed in Japanese Laid-Open Patent Application 64-14079.

In the case where the pigment layer or light reflection layer 14 is provided, an adhesive layer comprising as the main component a resin may be interposed between the support 11 and the pigment layer or light reflection layer 14 and between the pigment layer or light reflection layer 14 and recording layer 12 for improving the adhesion of these layers with the adjacent support or layer, if necessary.

When a transparent support is employed, it is possible to provide a recording layer on one side of the support and to provide a pigment layer or light reflection layer 15 on the other side thereof.

For the support 11, for example, a film, a sheet of paper, a metallic sheet and a ceramic plate can be employed. When the metallic sheet is used as the support 11, the support 11 also serves as a light reflection layer 14.

In the present invention, the bar code image formed on the reversible thermosensitive recording medium can be read by projecting light to the bar code display medium with an incident angle of 45° and detecting the light reflected at right angles with respect to the incident light. When the reflected light quantity is small, that portion is recognized as a part of the bar code image. For this reason, in the case of the bar code display medium shown in FIG. 1(a), a bar code image corresponds to a transparent portion, and a non-image area corresponds to a white opaque portion in the reversible thermosensitive recording medium.

In the case of the bar code display medium as shown in FIG. 1(b), it is necessary to place a colored member or light reflection member on the back side of the support 11 to read bar code images.

It is preferable that the reflectance of the bar code image area be 50% or less, and more preferably 30% or less. The reflectance of a non-image area (background) is preferably 30% or more, and more preferably 50% or more. Further, it is preferable that the difference between the reflectance of the bar code image area and that of the non-image area be at least 30% or more, more preferably 50% or more, and most preferably 70% or more.

Figure 2:
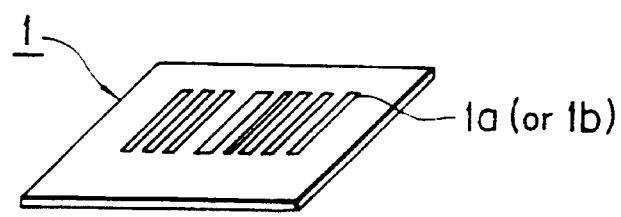
FIG. 2 is a perspective view of a card-type bar code display medium of the present invention.

FIG. 2 is a perspective view of a card-type bar code display medium according to the present invention, which can be prepared by cutting the card-type bar code medium with an appropriate size from the bar code display medium as shown in FIG. 1. In FIG. 2, reference numeral 1a or 1b indicates bar code images formed in the bar code display medium 1.

As the reversible thermosensitive recording layer 12 as shown in FIGS. 1(a) and 1(b), which reversibly varies in transparency with change in temperature, the following three types are possible:

(1) A type in which a low-molecular-weight organic material is dispersed in a resin matrix;

(2) A type which utilizes a blend of polymers; and (3) A type which utilizes a phase change of a phase-changeable polymeric liquid crystal.

The recording layer of type (1) is superior to the others in that the reversible change between a transparent state and a milky white opaque state is quick. Therefore, the formation and erasure of bar code images is quick and smooth. In addition, bar code images formed in the recording layer of type (1) have high resolution because the boundaries between the bar code image area and the non-image area (background) are remarkably sharp.

Thus, it is preferable that the recording layer of the rewritable bar code display medium according to the present invention comprise a resin matrix and a low-molecular-weight organic material dispersed in the resin matrix.

The present invention provides an image display method of forming an image in a white opaque state or in a transparent state, with application of heat to the above-mentioned rewritable bar code display medium, which comprises a support and a recording layer formed thereon comprising a resin matrix and a low-molecular-weight organic material dispersed in the resin matrix.

The recording layer of type (1) is switched from a milky white opaque state to a transparent state, or vice versa, depending on the temperature thereof.

In the transparent state and the white opaque state of the recording layer, the size of the crystals of the low-molecular-weight organic material, which is dispersed in the form of particles in a resin matrix, is considered to be different. In the transparent state, the low-molecular-weight organic material consists of relatively large crystals, possibly most of them being single crystals, so that the light which enters the crystals from one side passes therethrough to the opposite side, without being scattered, thus the recording layer appears transparent. In contrast to this, when the recording layer is in the white opaque state, the low-molecular-weight organic material is composed of polycrystals consisting of numerous small crystals, with the crystallographic axes pointed in various directions, so that the light which enters the recording layer is scattered a number of times on the interfaces of crystals of the low-molecular-weight material. As a result, the recording layer appears opaque in a white color.

The transition of the state of the recording layer depending on the temperature thereof will now be explained by referring to FIG. 3.

Figure 3:
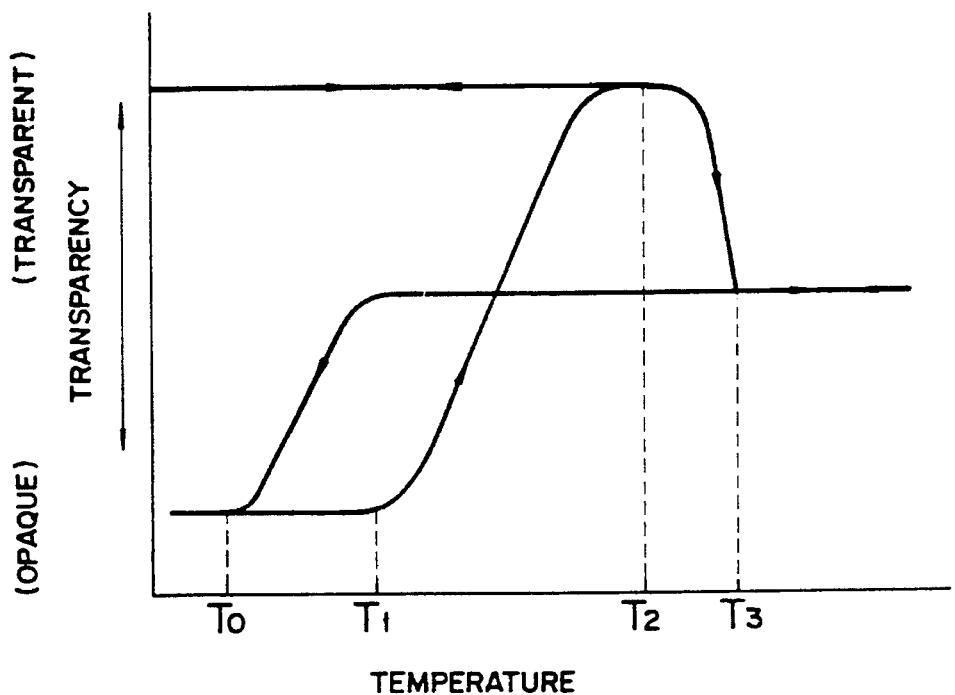
FIG. 3 is a graph in explanation of the changes in transparency of a reversible thermosensitive recording layer of the bar code display medium of the present invention.

In FIG. 3, it is supposed that the recording layer is initially in a white opaque state at room temperature $T_0$ or below. When the recording layer is heated to temperature $T_1$, the recording layer begins to become transparent. The recording layer completely becomes transparent when the temperature is further elevated to temperature $T_2$. Thus, the recording layer reaches a maximum transparent state at temperature $T_2$. Even if the recording layer which is already in the maximum transparent state is cooled to room temperature $T_0$ or below, the maximum transparent state is maintained. It is considered that this is because the low-molecular-weight organic material changes its state from a polycrystalline state to a single crystalline state via a semi-melted state during the above-mentioned heating and cooling steps.

When the recording layer in the maximum transparent state is further heated to temperature $T_3$, it reaches a medium state which is between the maximum transparent state and the white opaque state. When the recording layer in the medium state at temperature $T_3$ is cooled, the recording material returns to the original maximum opaque state, without passing through any transparent state. It is considered that this is because the low-molecular-weight organic material is melted when heated to temperature $T_3$ or above, and the polycrystals of the low-molecular-weight organic material grow and separate out when cooled to temperature $T_0$ or below. If the recording layer in the white opaque state is heated to any temperature between temperature T1 and temperature $T_2$, and then cooled to a temperature below $T_0$, the recording layer assumes an intermediate state between the transparent state and the white opaque state.

When the recording layer in the transparent state at room temperature $T_0$ is again heated to temperature $T_3$ or above, and then cooled to room temperature $T_0$, the recording layer returns to the maximum milky opaque state. Thus, the recording layer can assume a white maximum opaque state, a maximum transparent state and an intermediate state between the aforementioned two states at room temperature.

Therefore, a white opaque image can be obtained on a transparent background, or a transparent image on a white opaque background by selectively applying the thermal energy to the recording layer of the bar code display medium of the present invention. Further, such image formation can be repeated over a long period of time.

When consideration is given to the above-mentioned principle, it is preferable that the temperature range where the recording layer assumes a transparent state be relatively wide. In the present invention, the recording layer is considered to assume a transparent state in the temperature range from $T_4$ to $T_5$ in FIG. 4.

Figure 4:
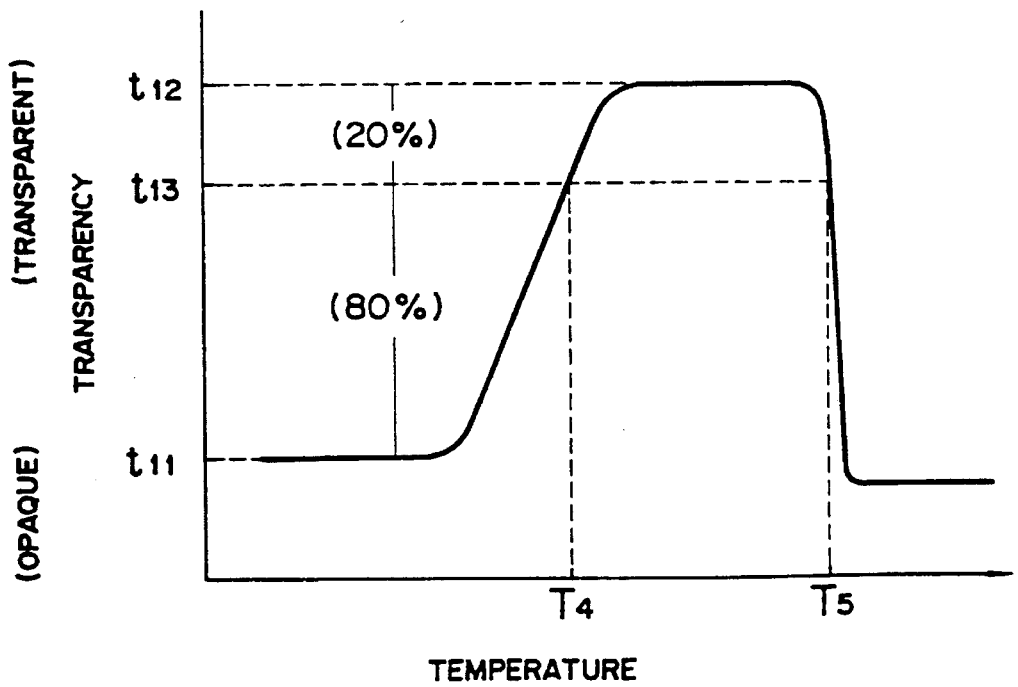
FIG. 4 is a graph in explanation of the temperature range in which the reversible thermosensitive recording layer of the bar code display medium of the present invention assumes a transparent state.

More specifically, as shown in FIG. 4, the recording layer is in the white opaque state when the transparency of the recording layer is at $t_{11}$. In contrast to this, the recording layer with transparency $t_{12}$ is supposed to assume the maximum transparent state. When the transparency of the recording layer reaches 80% of the range from $t_{11}$ to $t_{12}$, that is, the transparency is at $t_{13}$ in FIG. 4, the recording layer is regarded to assume a substantial transparent state. Within the temperature range from $T_4$ to $T_5$, the recording layer of the bar code display medium according to the present invention is in the transparent state. In addition, the difference between $T_5$ and $T_4$ is defined as a temperature region of the transparent state.

In the present invention, it is preferable that the temperature region ($T_5$–$T_4$) of the transparent state be 15° C. or more, and more preferably 22° C. or more, and much more preferably 30° C. or more, and most preferably 35° C. or more. However, when the temperature region of the transparent state is too wide, the temperature at which the recording layer is changed into a white opaque state is extremely increased, so that the thermal sensitivity of the recording layer is decreased when a white opaque image is formed in the bar code display medium. Therefore, the above-mentioned temperature region of the transparent state is preferably 80° C. or less, and more preferably 50° C. or less.

In order to control the temperature region of the transparent state to 15° C. or more, several low-molecular-weight organic materials, which will be described later, are used in combination, or the organic low-molecular-weight materials and other materials having different melting points are mixed as disclosed in Japanese Laid-Open Patent Applications 63-39378, 63-130380, 2-1363 and 3-2020.

In the recording layer prepared by the above-mentioned method (1), when the low-molecular-weight organic material has an average particle diameter in the range of 0.1 to 2.0 μm, the whiteness of the white opaque state is high and the image contrast is sufficiently increased to read a bar code image.

As previously mentioned, the crystalline state of the low-molecular-weight organic material contained in the recording layer of the bar code display medium is altered from a single crystal state to a polycrystalline state, and vice versa, depending on the temperature thereof. The bar code image can be formed in the recording layer or erased therefrom by utilizing the phenomenon whether the light is scattered by the low-molecular-weight organic material or transmitted therethrough, depending on the crystalline state of the low-molecular-weight organic material. Therefore, the crystal growth of the low-molecular-weight organic material has an important effect on the phenomenon of the light scattering or light transmission, and the phenomenon of the light scattering or light transmission is considered to depend on the particle diameter of the low-molecular-weight organic material dispersed in the resin matrix.

It is considered that, depending upon the particle diameter of the low-molecular-weight organic material, the degree of the interaction between the low-molecular-weight organic material and the resin matrix changes. More specifically, it is considered that the greater the average particle diameter of the low-molecular-weight organic material dispersed in the resin matrix, the less the polycrystalline state in the low-molecular-weight organic compound, and the smaller the light-scattering effect of the low-molecular-weight organic material, and the lower the whiteness of the white opaque state and the lower the contrast of the obtained images, and on the other hand, the smaller the average particle diameter of the low-molecular-weight organic material, the more difficult the formation of the polycrystalline state of the low-molecular-weight organic material and the lower the whiteness of the white opaque portion and the lower the contrast of the obtained images.

Furthermore, in the image display method of the present invention, it is preferable that a light beam with a wavelength in the range of ⅛ to 2 times the average particle diameter of the low-molecular-weight organic material be applied to the recording layer to read a bar code image. In this case, the image contrast is further improved. The reasons for this phenomenon have not yet been clarified. However our speculation is as follows:

The whiteness of the white opaque state, that is, the degree of light scattering from the low-molecular organic material, depends upon the size of the crystals of the low-molecular organic material dispersed in the resin matrix. The size of the crystals of the low-molecular organic material also depend upon the particle size of the low-molecular organic material itself. This is because the the interfacial area between the resin matrix and the low-molecular-weight organic material dispersed therein is determined by the particle size of the organic low-molecular-weight material. Depending on the above-mentioned interfacial area, the intensity of the interaction between the resin matrix and the low-molecular-weight organic material varies. Furthermore, the intensity of the interaction has an effect on the size of the crystals contained in the particle of the low-molecular-weight organic material.

There is a particular size of a crystal at which a light beam with a particular wavelength is most scattered. The above-mentioned size of the crystal is different for each material. Generally, light is most scattered by a crystal having a particle diameter which is smaller than the wavelength of the light. In the present invention, it is considered that when the wavelength of a light beam for reading a bar code is in the range of ⅛ to 2 times the average particle diameter of the low-molecular weight organic compound, the crystals in the polycrystalline state contained in the low-molecular-weight organic material have such a size that the light is most scattered.

When the relationship between the average particle diameter of the low-molecular-weight organic material and the wavelength of the light employed to read the bar code image in the above-mentioned range, the whiteness of the white opaque portion is increased, which improves the image contrast.

To control the average particle diameter of the low-molecular-weight organic material, for example, a bad solvent may be added to the solvent for formation of the recording layer, the heating and drying conditions of a coated liquid for the recording layer may appropriately be controlled, and a surface active agent may be added to the coating liquid for the recording layer to control the dispersibility of the low-molecular-weight material.

It is preferable that the thickness of the recording layer be in the range of 1 to 30 µm, and more preferably in the range of 2 to 20 µm. When the thickness of the recording layer is within the above range, the thermal energy can uniformly be conducted, thereby forming a uniformly transparent recording layer when it assumes a transparent state, and the decrease in the whiteness of the white opaque state can be avoided. As will be described in more detail, a fatty acid is contained in a relatively large amount in the recording layer, the whiteness of the white opaque state can be increased.

Conventionally, the wavelength of a light beam employed to read a bar code image is regulated to be as 600 nm or more in JIS (Japanese Industrial Standards) B 9550. The light beams with a wavelength from 600 to 1000 nm are employed for use in practice. For instance, LEDs for a wavelength of 660 nm and for a wavelength of 940 nm, and He-Ne laser with a wavelength of 660 nm and semiconductor laser with a wavelength of 680 nm, 780 nm and 900 nm are widely used.

To read the bar code image formed on a bar code display medium of a type of the present invention, with the recording layer comprising a resin matrix and a low-molecular-weight organic material dispersed in the resin matrix, not only the light beams with a wavelength of 600 nm or more, but also those with a wavelength of 600 nm or less can be employed. According to our test, it has been confirmed that when a light beam with a wavelength of 600 nm or less is applied to that kind of recording layer of the bar code display medium, the bar code image can be read with higher image contrast. For example, when a light beam with a wavelength of 400 to 600 nm is employed, the image contrast of the bar code image may be approximately doubled as compared with the case where a light beam with a wavelength of 600 to 1000 nm is used. This is because the refractive index of the low-molecular-weight organic material with respect to a light beam with a shorter wavelength is larger than that with respect to a light beam with a longer wavelength, so that the amount of the light scattered by the low-molecular-weight material is increased and the whiteness of the white opaque state can be improved when a light beam with a shorter wavelength is employed.

The present invention also provides an image display apparatus for the aforementioned rewritable bar code display medium of the present present invention, which comprises (a) a bar code reading means for optically reading a bar code formed on the aforementioned rewritable bar code display medium of the present invention; and (b) a bar code erasing means for erasing the bar code formed on the bar code display medium with application of heat thereto.

Figure 5:
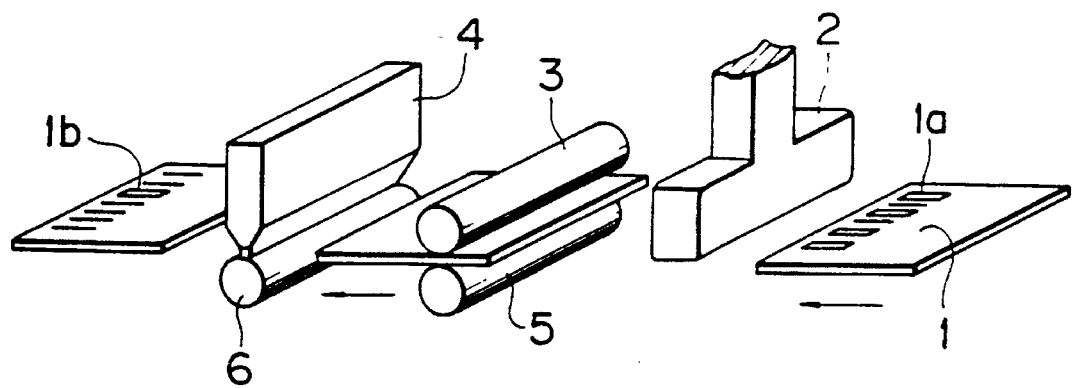
FIG. 5 is a schematic diagram in explanation of an example of am image display apparatus-for reading, erasing and forming bar code images.

The image display apparatus according to the present invention may further comprise a bar code formation means for forming a bar code image by application of heat to the rewritable bar code display medium, as shown in FIG. 5.

FIG. 5 is a schematic diagram of an example of the image display apparatus according to the present invention, which comprises a bar code reading means, a bar code erasing means and a bar code formation means. More specifically, in the figure, a rewritable bar code display medium 1, for example, of a card-type as shown in FIG. 2, carries bar code images 1a. These bar code images 1a are read by a bar code scanner 2, and then erased while they are caused to pass between a heat-application roller 3 and a transporting rubber roller 5. Another bar code images 1b are newly formed on the bar code display medium 1 by application of heat from a thermal head 4 to which a platen roller 6 is directed.

As an erasing means for erasing the bar code images 1a, in addition to the above-mentioned heat-application roller 3, for example, a hot-stamp, an infrared lamp, and a thermal head can be employed. As a bar code forming means for forming bar code images 1a or 1b, in addition to the thermal head 4, a laser emitting device can be used. Furthermore, as a bar code reading means for optically reading the bar code images 1a or 1b, the above-mentioned bar code scanner 2 is in general use. However, in addition to this, a method of projecting a light beam by a laser or an LED, and reading the changes in the amount of the light reflected from the rewritable bar code display medium 1 by a charge coupled device.

The image display apparatus is not limited to the above, but may be designed in such a manner that each of the above-mentioned means is integrally constructed or separately constructed. More specifically, to change the price display of a commercial product or to revise the information relating thereto at a manufacturing process, first, an optical recognition pattern is optically read and the data processing is then conducted. At last, an updated bar code image is formed on the bar code display medium. In this procedure, a bar code erasing operation may be carried out prior to, in the course of or after the data processing. In any event, the erasing operation is finished by the time of the formation of the updated bar code image. Therefore, the image display apparatus of the present invention may be designed so that all the bar code reading means, the bar code erasing means and the bar code formation means be integrated in one apparatus; or any two means among them may be integrated in one apparatus with the remaining one means being independent; or three means be independently imparted to the respective units.

To prepare the bar code display medium of the present invention, a solution in which a resin matrix and an low-molecular-weight organic material are dissolved is coated on a transparent support such as a plastic sheet or glass plate, or a light reflection layer or pigment layer formed on the support, and dried. Alternatively, a plurality of different low-molecular-weight organic materials in the form of finely-divided particles is dispersed in a resin matrix solution employing a solvent in which at least one low-molecular-weight organic material is not dissolved therein. The thus prepared dispersion is coated on the above-mentioned support, or on a light reflection layer or pigment layer.

The solvent used for the formation of the recording layer can be selected in accordance with the type of the low-molecular-weight organic material and the kind of the resin matrix to be employed. For example, organic solvents such as tetrahydrofuran, methyl ethyl ketone, methyl isobutyl ketone, chloroform, carbon tetrachloride, ethanol, toluene and benzene can be employed. In the thus formed recording layer, the low-molecular-weight organic material is dispersed in the matrix resin in the form of finely-divided particles.

It is preferable to employ such matrix resins that can uniformly hold the particles of the organic low-molecular-weight material therein, and impart high transparency to the recording layer when the recording layer is in a maximum transparent state, and are mechanically stable and have excellent film-forming properties.

Specific examples of the resin matrix for use in the recording layer of the bar code display medium are vinyl chloride copolymers such as polyvinyl chloride, vinyl chloride-vinyl acetate copolymer, vinyl chloride-vinyl acetate-vinyl alcohol copolymer, vinyl chloride-vinyl acetate-maleic acid copolymer and vinyl chloride-acrylate copolymer; vinylidene chloride copolymers such as polyvinylidene chloride, vinylidene chloride-vinyl chloride copolymer and vinylidene chloride-acrylonitrile copolymer; polyester; polyamide; polyacrylate, polymethacrylate and acrylate-methacrylate copolymer; and silicone resin. These resins may be used alone or in combination.

The low-molecular-weight organic material for use in the present invention may be appropriately selected in accordance with each of the desired temperature ranges, $T_0$ to $T_1$, $T_1$ to $T_2$ and $T_2$ to $T_3$. It is preferable that low-molecular-weight organic materials have a melting point ranging from 30° to 200° C., more preferably from about 50° to 150° C.

Examples of the low-molecular-weight organic materials are alkanols; alkane diols; halogenated alkanols or halogenated alkane diols; alkylamines; alkanes; alkenes; alkynes; halogenated alkanes; halogenated alkenes; halogenated alkynes; cycloalkanes; cycloalkenes; cyclo-alkynes; saturated or unsaturated monocarboxylic acids, or saturated or unsaturated dicarboxylic acids, and esters, amides and ammonium salts thereof; saturated or unsaturated halogenated fatty acids, and esters, amides and ammonium salts thereof; arylcarboxylic acids, and esters, amides and ammonium salts thereof; halogenated arylcarboxylic acids, and esters, amides and ammonium salts thereof; thioalcohols; thiocarboxylic acids, and esters, amides and ammonium salts thereof; and carboxylic acid esters of thioalcohol. These materials can be used alone or in combination. It is preferable that the number of carbon atoms of the above-mentioned low-molecular-weight material be in the range of 10 to 60, more preferably in the range of 10 to 38, further preferably in the range of 10 to 30. Part of the alcohol groups in the esters may be saturated or unsaturated, and further may be substituted by halogen. In any case, it is preferable that the organic low-molecular-weight material have at least one atom selected from the group consisting of oxygen, nitrogen, sulfur and halogen in its molecule. More specifically, it is preferable the low-molecular-weight organic materials comprise, for instance, —OH, —COOH, —CONH, —COOR (wherein R is $NH_4$ or an alkyl group having 1 to 20 carbon atoms), —NH, —$NH_2$, —S, —S—S, —O and a halogen atom.

Specific examples of the above-mentioned organic low-molecular-weight materials include higher fatty acids such as lauric acid, dodecanoic acid, myristic acid, pentadecanoic acid, palmitic acid, stearic acid, behenic acid, nonadecanoic acid, arachic acid and oleic acid; esters of higher fatty acids such as methyl stearate, tetradecyl stearate, octadecyl stearate, octadecyl laurate, tetradecyl palmitate and docosyl behenate; and the following ethers or thioethers:

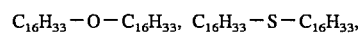

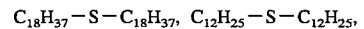

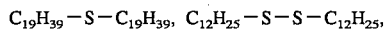

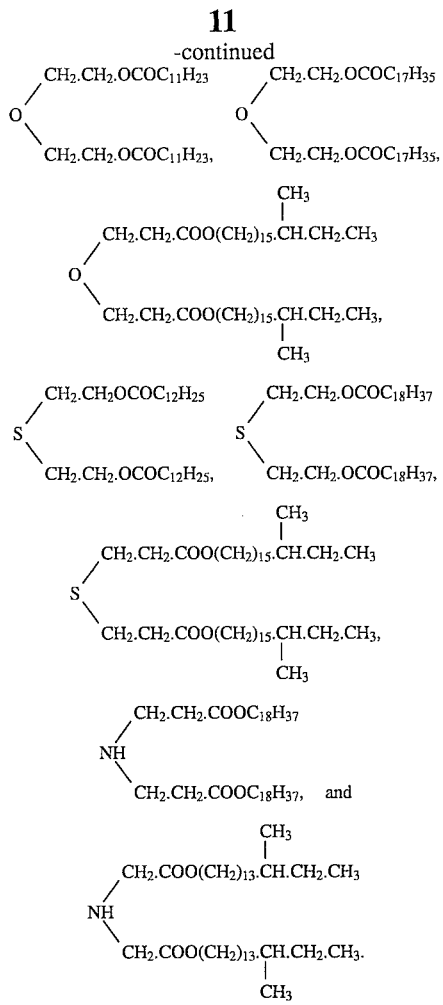

Of these, higher fatty acids having 16 or more carbon atoms, more preferably having 16 to 24 carbon atoms, such as palmitic acid, stearic acid, behenic acid and lignoceric acid are preferred in the present invention.

It is preferable that the ratio by weight of the low-molecular-weight organic material to the resin matrix be in the range of about (2:1) to (1:16), and more preferably in the range of (1:2) to (1:6). When the ratio of the low-molecular-weight organic material to the resin matrix is within the above range, not only the resin matrix can form a film in which the organic low-molecular-weight material is uniformly dispersed in the form of finely-divided particles, but also the obtained recording layer can readily reach the maximum white opaque state.

In the present invention, some additives such as a surface active agent and a high boiling point solvent may be added to the above-mentioned resin matrix and the low-molecular-weight organic material to facilitate the formation of a transparent image (bar code image).

Examples of the surface-active agent for use in the present invention are polyhydric alcohol higher fatty acid esters; polyhydric alcohol higher alkyl ethers; higher alcohols; higher alkylphenol; higher alkylamine of higher fatty acid; amides of higher fatty acid; lower olefin oxide adducts of oil and fat, and lower olefin oxide adducts of polypropylene glycol; acetylene glycol; sodium, calcium, barium and magnesium salts of higher alkyl benzenesulfonic acid; calcium, barium and magnesium salts of aromatic carboxylic acid; higher aliphatic sulfonic acid, aromatic sulfonic acid, sulfuric monoester, phosphoric monoester and phosphoric diester; lower sulfated oil; long-chain polyalkyl acrylate; acrylic oligomer; long-chain polyalkyl methacrylate; long-chain alkyl methacrylate-amine-containing monomer copolymer; styrene-maleic anhydride copolymer; and olefin-maleic anhydride copolymer.

Examples of the high boiling point solvent for use in the present invention include tributyl phosphate, tri-2-ethylhexyl phosphate, triphenyl phosphate, tricresyl phosphate, butyl oleate, dimethyl phthalate, diethyl phthalate, dibutyl phthalate, diheptyl phthalate, di-n-octyl phthalate, di-2-ethylhexyl phthalate, diisononyl phthalate, dioctyldecyl phthalate, diisodecyl phthalate, butylbenzyl phthalate, dibutyl adipate, di-n-hexyl adipate, di-2-ethylhexyl adipate, di-2-ethylhexyl azelate, dibutyl sebacate, di-2-ethylhexyl sebacate, diethylene glycol dibenzoate, triethylene glycol, di-2-ethylbutyrate, methyl acetylricinoleate, butyl acetylricinoleate, butylphthalyl butyl glycolate and tributyl acetylcitrate.

When the recording layer in which the organic low-molecular-weight material is dispersed in the resin matrix is repeatedly heated at high temperatures, the resin matrix is gradually softened and the particles of the low-molecular-weight organic material are crushed, with the result that the degree of whiteness of the white opaque state being decreased. In addition, the temperature at which such a recording layer assumes a white opaque state is higher than the temperature at which it assumes a transparent state. In such a case, the white opaque bar code image may be formed on the transparent background. The reason for this is that the durability of the recording layer can be improved even though the image formation and erasing is repeated. This is because the bar code image area is generally smaller than the non-image area (background) as a whole. Therefore, if the bar code display medium is designed to form the white opaque bar code image thereon, the area to be made white opaque by application of heat thereto can be minimized. In this case, it is necessary to design the bar code reading means to recognize the white opaque area as a bar code image.

In the present invention, a protective layer may be formed on the recording layer, as shown in FIGS. 1(a) and 1(b). The thickness of the protective layer is preferably in the range of 0.1 to 5 μm.

The material for the protective layer may be a silicone rubber and a silicone resin (as disclosed in Japanese Laid-Open Patent Application 63-221087); a polysiloxane graft polymer (as disclosed in Japanese Patent Application No. 62-152550); and an ultraviolet-cured resin or electron radiation cured resin (as disclosed in Japanese Patent Application No. 63-310600). Any materials may be dissolved in a solvent when coated. It is preferable that the solubilities of the resin matrix and the organic low-molecular-weight material contained in the recording layer in the above solvent be as low as possible.

Examples of such a solvent for use in the formation of the protective layer include n-hexane, methyl alcohol, ethyl alcohol and isopropyl alcohol. Of these, alcohol-based solvents are desirable from the viewpoint of cost.

The previously mentioned recording layer of polymer blend type (2) will now be explained in detail.

This type of recording layer is a thin film comprising two or more stable polymers. The state of the polymers is changed at a peculiar temperature. These polymers are uniformly compatible with each other within the temperature range lower than the above-mentioned temperature. Within the higher temperature range, the polymers are separated in the form of phases. When the polymers with different refractive index are employed, the polymers in the compatible state show uniform transparency and the polymers in the phase-separation state scatter the light, so that they appear opaque.

There are conventionally known some combinations of polymers which induce the phase change of Lower Critical Solution Temperature (LCST) type. For instance, there are known the combination of polyvinylidene fluoride and polymethyl acrylate, polyethylacrylate, polymethyl methacrylate or polyethyl methacrylate, and the combination of polycaprolactam and polycarbonate (R. E. Bernstein et. al., Macromolecules 10 p681-(1977)); the combination of polystyrene and polyvinyl methyl ether (M. Bank et. al., J. Polym. Sci. A-2.10 p1097-(1972)); the combination of styrene-acrylonitrile copolymer and polycaprolactam (L. P. McMaster, Macromolecules 6 p760-(1973)); the combination of styrene-acrylonitrile copolymer and polymethyl methacrylate (L. P. McMaster, Polym. Prepr., 16 p254-(1974)); the combination of polyvinyl nitrate and polymethyl acrylate (Saburo Akiyama, et. al., Japan Journal of Polymer Science 33 p238-(1976)); the combination of polyvinylidene fluoride and polyvinyl methyl ketone (D. R. Paul et. al., Polym, Eng. Sci., 18 p1225-(1978)); and the combination of ethylene-vinyl acetate copolymer and chlorinated rubber (J. Leffingwell, et. al., Polym. Prepr., 14 p596-(1973)).

The polymers for the polymer blend type recording layer generally separate in the form of phases at temperatures in the range from 100° to 200° C., and scatter the light, so that the recording layer assumes an opaque state. By rapidly cooling the recording layer in the phase-separation state (opaque state), this state can be fixed. Thereafter, the recording layer is returned to the compatible state (transparent state) when once heated to a temperature higher than the temperature at which it assumes the phase-separation state and gradually cooled.

The recording layer comprising a polymeric liquid crystal, of the above-mentioned type (3), will now be explained.

Liquid crystals of a thermotropic type which assume a nematic state, a smectic state or a cholesteric phase can be used for the recording layer of the bar code display medium of the present invention. For example, a side-chain type high-molecular liquid crystal having a methacrylic acid polymer or siloxane polymer as a main chain with low-molecular liquid crystal added thereto in the pendant form; and a main-chain type high-molecular liquid crystal such as a high strength-high elasticity-high heat-resistant fiber and polyester-based or polyamide-based high-molecular liquid crystal which is known in the field of a resin.

In the above-mentioned three types of recording layer for use in the present invention, the bar code image can be formed with higher resolution as compared with the bar code image prepared by using the thermosensitive recording paper or the thermal image transfer ink ribbon. Therefore, the bar code display medium of the present invention is suitable for forming a high-density small-size bar code image. Of these three types of recording layer, the recording layer comprising the resin matrix and the organic low-molecular-weight material is most preferable.

These recording layers of the bar code display medium according to the present invention have excellent chemical resistance, so that the bar code image is not erased, for example, when dipped into alcohol. In addition, the bar code display medium of the present invention does not absorb the light, so that the fading of bar code images does not occur.

Other features of this invention will become apparent in the course of the following description of exemplary embodiments, which are given for illustration of the invention and are not intended to be limiting thereof.

Example 1

Al was vacuum-deposited in a thickness of about 400 on one surface of a 100 μm thick transparent polyester film serving as a support, so that a light reflection layer was formed on the support.

A mixture of the following components was dispersed and the thus obtained coating liquid was coated on the above-prepared Al-deposited surface of the polyester film by a wire bar and dried at 100° C., so that a recording layer with a thickness of about 10 μm was formed.

|  | Parts by Weight |
| --- | --- |
| Behenic acid | 8 |
| Hexadenedioic acid | 2 |
| Di-2-ethylhexyl phthalate | 2 |
| Vinyl chloride - vinyl acetate phosphoric ester copolymer (Trademark "Denka Vinyl #1000P" made by Denki Kagaku Kogyo K.K. | 30 |
| Tetrahydrofuran | 150 |
| Toluene | 10 |

On the thus prepared recording layer, a coating liquid consisting of 10 parts by weight of a commercially available polyamide resin "CM8000" (Trademark), made by Toray Industries, Inc., and 90 parts by weight of methyl alcohol was coated by a wire bar and dried under application of heat, so that an intermediate layer with a thickness of about 0.5 μm was formed.

A commercially available butyl acetate solution of ultraviolet-cured urethane acrylate type resin, "Unidic 17-824-9" (Trademark), made by Dainippon Ink & Chemicals, Incorporated was coated on the above-prepared intermediate layer by a wire bar and dried under application of heat, and thereafter, the coated surface was exposed to ultraviolet light for 5 seconds using an ultraviolet lamp with an output of 80 W/cm, whereby a protective layer with a thickness of about 4 μm was provided. Thus, a bar code display medium according to the present invention, as shown in FIG. 1(a), was prepared.

The thus prepared bar code display medium was heated at 80° C. and then cooled, so that the recording layer entirely assumed a transparent state. Thereafter, the bar code display medium was cut into an appropriate size, whereby card-type bar code display medium No. 1, as shown in FIG. 2, was obtained.

Example 2

Al was vacuum-deposited in a thickness of about 400 on one surface of a 100-μm-thick transparent polyester film serving as a support, so that a light reflection layer was formed on the support.

A mixture of the following components was dispersed and the thus obtained coating liquid was coated on the above-prepared Al-deposited surface of the polyester film by a wire bar, with the polyester film placed on a hot plate of 70° C., so that a recording layer with a thickness of about 10 μm was formed.

|  | Parts by Weight |
| --- | --- |
| Behenic acid | 8 |
| Octadenedioic acid | 2 |
| Di-2-ethylhexyl phthalate | 2 |
| Vinyl chloride - vinyl acetate - phosphoric ester copolymer (Trademark "Denka Vinyl #1000P" made by Denki Kagaku Kogyo K.K. | 30 |
| Tetrahydrofuran | 150 |
| Toluene | 10 |

On the thus prepared recording layer, an intermediate layer and a protective layer were successively overlaid in the same manner as in Example 1. Thus, a bar code display medium according to the present invention, as shown in FIG. 1(a), was prepared.

The thus prepared bar code display medium was heated at 80° C. and then cooled, so that the recording layer entirely assumed a transparent state. Thereafter, the bar code display medium was cut into an appropriate size, whereby card-type bar code display medium No. 2, as shown in FIG. 2, was obtained.

Example 3

The procedure for preparation of the card-type bar code display medium No. 1 in Example 1 was repeated except that hexadenedioic acid in the formulation for the recording layer coating liquid used in Example 1 was replaced by azelaic acid. Thus, a card-type bar code display medium No. 3 as shown in FIG. 2 was prepared.

Example 4

One surface of a 100-μm-thick transparent polyester film serving as a support was entirely printed in a black color, so that a pigment layer was formed on the support.

On the thus prepared pigment layer, a recording layer, an intermediate layer and a protective layer were successively overlaid in the same manner as in Example 2. Thus, a bar code display medium according to the present invention, as shown in FIG. 1(a), was prepared.

The thus prepared bar code display medium was heated at 80° C. and then cooled, so that the recording layer entirely assumed a transparent state. Thereafter, the bar code display medium was cut into an appropriate size, whereby card-type bar code display medium No. 4, as shown in FIG. 2, was obtained.

Each of the above-prepared bar code display media No. 1 to No. 4 according to the present invention was evaluated with respect to the temperature region of the transparent state (Evaluation Item (1)) and the average particle diameter of the low-molecular-weight organic material employed in the recording layer (Evaluation Item (2)). The results are given in Table 1.

TABLE 1

| Bar Code Display Medium No. | Evaluation Item (1) [°C.] | Evaluation Item (2) [μm] |
| --- | --- | --- |
| No. 1 | 18 | Approx. 0.5 |
| No. 2 | 22 | Approx. 0.3 |
| No. 3 | 11 | Approx. 0.3 |
| No. 4 | 22 | Approx. 0.3 |

Using a thermal head (8 dots/mm), thermal energy was applied to each bar code display medium in the transparent state, as shown in FIG. 3, whereby transparent bar code images carrying numerical information with the minimum line width of 0.25 mm were formed on the white opaque background.

Comparative Example 1

Using a thermal head as shown in FIG. 3, thermal energy was applied to a commercially available thermosensitive recording paper "Thermal Paper Type 120LAB" (Trademark), made by Ricoh Company, Ltd., so that bar code images were formed thereon.

Comparative Example 2

Using a thermal head as shown in FIG. 3, thermal energy was applied to a commercially available thermal image transfer ink ribbon "B110A" (Trademark), made by Ricoh Company, Ltd., placed on a sheet of plain paper, so that bar code images were thermally transferred to the sheet of plain paper.

Using the thus obtained six kinds of bar code image display medium having the bar code images, the following tests and measurements were conducted. The results are shown below.

1. The reflectance and the width of a bar code image portion and a space portion were measured by a commercially available scanner "AUTO SCAN 6000" (Trademark), made by RJS, Inc. The print contrast signal (PCS) value, which represents the image contrast, defined in JIS B 9550, was calculated from the reflectance of the bar code image portion and the space portion in accordance with the following formula, and the standard deviation of width was obtained from the measurement of the width of a bar code image portion and a space portion.

$$PCS \text{ Value } (\%) = \frac{(\text{Reflectance of Space Portion}) - (\text{Reflectance of Bar Code Image Portion})}{\text{Reflectance of Space Portion}} \times 100$$

Furthermore, the bar code images were read by a bar code reader repeatedly 100 times. It was counted how many times the bar code images were accurately read by the bar code reader, and the accurate bar code reading ratio was expressed in terms of percentage.

TABLE 2

| | Reflectance (%) | | PCS Value (%) | Standard Deviation of Width (μm) | Accurate Reading Ratio (%) |
| --- | --- | --- | --- | --- | --- |
| | Space | Bar Code Image | | | |
| Ex. 1 | 83 | 11 | 86.7 | 2.7 | 100 |
| Ex. 2 | 81 | 10 | 87.7 | 2.9 | 100 |
| Ex. 3 | 85 | 12 | 85.9 | 2.8 | 100 |
| Ex. 4 | 28 | 4 | 85.7 | 3.0 | 98 |
| Comp Ex. 1 | 86 | 9 | 89.5 | 4.7 | 100 |
| Comp Ex. 2 | 81 | 7 | 91.4 | 4.1 | 98 |

2. To conduct a chemical-resistance test, each of the above-mentioned six kinds of bar code display medium carrying bar code images was dipped into whiskey containing an alcohol content of 43% for 10 minutes. The accurate bar code reading ratio measured by a bar code reader after the chemical-resistance test is shown in Table 3.

In addition, to conduct a light-resistance test, each bar code display medium was exposed to carbon arc for 20 hours using a carbon arc fadeometer. The accurate bar code reading ratio by a bar code reader after the light-resistance test is also shown in Table 3.

TABLE 3

|  | Accurate Reading Ratio after Chemical-resistance Test (%) | Accurate Reading Ratio after Light-resistance Test (%) |
| --- | --- | --- |
| Ex. 1 | 100 | 100 |
| Ex. 2 | 100 | 100 |
| Ex. 3 | 100 | 100 |
| Ex. 4 | 98 | 98 |
| Comp. Ex. 1 | 0 | 25 |
| Comp. Ex. 2 | 70 | 97 |

Furthermore, using a thermal head (16 dots/mm), thermal energy was applied to each bar code display medium in the transparent state separately obtained in Examples 1 to 4, whereby transparent bar code images carrying numerical information with the minimum line width of about 60 μm were formed on the white opaque background.

In addition, Comparative Examples 2 and 3 were separately repeated except that bar code images were formed by using a thermal head (16 dots/mm), so that bar code images with the minimum line width of about 60 μm were formed.

Using the thus obtained six kinds of bar code image display medium carrying the bar code images, the reflectance of a bar code image portion and a space portion, the PCS value, the standard deviation and the accurate reading ratio were measured in the same manner as in the above. The results are given in Table 4.

TABLE 4

|  | Reflectance (%) | | PCS Value (%) | Standard Deviation of Width (μm) | Accurate Reading Ratio (%) |
| --- | --- | --- | --- | --- | --- |
|  | Space | Bar Code Image | | | |
| Ex. 1 | 82 | 10 | 87.8 | 1.1 | 100 |
| Ex. 2 | 80 | 9 | 88.8 | 1.1 | 100 |
| Ex. 3 | 83 | 11 | 86.7 | 1.2 | 100 |
| Ex. 4 | 29 | 4 | 86.2 | 1.3 | 95 |
| Comp Ex. 1 | 85 | 11 | 87.1 | 4.2 | 12 (*) |
| Comp Ex. 2 | 81 | 8 | 90.1 | 4.0 | 11 (*) |

(*) There were much omission and void in the bar code images.

The standard deviation of the width obtained from the measurements of the width of a bar code image portion and a space portion has an important effect on the bar code image reading ratio. The bar code image is converted into information by reading the width of the bar code image portion and the space portion. Therefore, when the standard deviation of the width is increased, the bar code image cannot accurately be read or the optically read bar code image may be converted into wrong information.

In the case where the bar code images is formed on the thermosensitive recording paper in Comparative Example 1, the thermal head is not brought into close contact with the thermosensitive recording paper because the surface of the thermosensitive recording paper is rough. As a result, the void occurs in the bar code image, so that uniform bar code images cannot be formed.

In the case where the bar code images are thermally transferred to a sheet of paper using a thermal image transfer ink ribbon in Comparative Example 2, the ink is not uniformly peeled off the ink ribbon, so that the obtained bar code images are free from sharpness and the images cannot be formed faithfully.

Such disadvantages become striking especially when the bar code image with a narrow width is formed. Specifically, when the high density bar code image with a minimum line width of 60 μm is formed, the standard deviation of the width in Comparative Examples 1 and 2 becomes as high as four times that in Examples 1 to 4, as can be seen in Table 4. Consequently, the accurate reading ratio is considerably lowered.

[Evaluation of Bar Code Display Media of Example 2 and 3]

A high density bar code image was separately formed on the bar code display media obtained in Examples 2 and 3 by use of the thermal head of 16 dots/mm. Then, the thus formed bar code image was erased by using the heat roller as shown in FIG. 5. The formation and erasure of the bar code was repeated 50 times. After the repetition of the formation and erasure of the bar code, the accurate reading ratio of the bar code display medium in Example 2 was 100%, while the accurate reading ratio of the bar code display medium in Example 3 was 92% because of a slight decrease in transparency in the transparent portion.

Furthermore, the bar code display medium obtained in Example 2 was initially made transparent in its entirety, and a high density opaque bar code was formed by use of the thermal head of 16 dots/mm. The opaque bar code was then erased by use of the heat roller as shown in FIG. 5. The formation and erasure of the bar code was repeated 200 times, and the bar code was read by a bar code reading apparatus which was modified so as to be capable of reading the opaque bar code. The accurate reading ratio was 100%.

By contrast to the above, when the bar code display medium obtained in Example 2 was initially made opaque in its entirety, and a high density transparent bar code was formed by use of the thermal head of 16 dots/mm. The transparent bar code was then erased by use of the heat roller as shown in FIG. 5. The formation and erasure of the bar code was repeated 200 times, and the bar code was read by a bar code reading apparatus. The accurate reading ratio was initially 100%, but decreased to 97% when the formation and erasure of the bar code was repeated 200 times.

As previously mentioned, since the bar code display medium of the present invention comprises a recording layer which can reversibly change from a transparent state to a white opaque state, and vice versa, depending on the temperature thereof, the bar code images carrying various information such as price are rewritable. In addition, the resolution of the bar code images formed on the bar code display medium of the present invention is high and the chemical-resistance is also excellent.

In particular, when the recording layer of the bar code display medium according to the present invention, which comprises a resin matrix and an low-molecular-weight organic material dispersed therein, is employed, the bar code images can be formed sharply against the background, and the image formation and erasing speed becomes high.

In addition, since the image display apparatus according to the present invention comprises a bar code reading means for optically reading a bar code formed on the above-mentioned rewritable bar code display medium, and a bar code erasing means for erasing an optically read bar code by applying the thermal energy to the bar code display medium, this apparatus is convenient for rewriting the bar code carrying numerical information.

What is claimed is:

1. An image display apparatus comprising: (a) a bar code reading means for optically reading a bar code formed on a rewritable bar code display medium comprising a support and a reversible thermosensitive recording layer formed thereon which varies in transparency with change in temperature and which comprises a resin matrix and a low-molecular weight organic compound dispersed in said resin matrix; (b) a bar code erasing means for erasing an optically read bar code formed on said bar code display medium, and (c) a bar code formation means for forming a bar code by application of heat to said rewritable bar code display medium.

2. The image display apparatus as claimed in claim 1, wherein the width of the temperature range in which said reversible thermosensitive recording layer is transparent is 15 to 80 degrees C.

3. The image display apparatus as claimed in claim 1, wherein the wavelength of a light beam for reading said bar code is in the range of 1/8 to 2 times the average particle diameter of the low-molecular weight organic compound.

4. The image display apparatus as claimed in claim 1, wherein said low-molecular organic compound has an average particle diameter in the range of 0.1 μm to 2.0 μm.

5. The image display apparatus as claimed in claim 1, further comprising a light reflection layer which is interposed between said support and said reversible thermosensitive recording layer.

6. The image display apparatus as claimed in claim 1, further comprising a pigment layer which is interposed between said support and said reversible thermosensitive recording layer.

7. The image display apparatus as claimed in claim 1, further comprising a light reflection layer which is provided on the back side of said support opposite to said reversible thermosensitive recording layer.

8. The image display apparatus as claimed in claim 1, further comprising a pigment layer which is provided on the back side of said support opposite to said reversible thermosensitive recording layer.

* * * * *

UNITED STATES PATENT AND TRADEMARK OFFICE
CERTIFICATE OF CORRECTION

PATENT NO. : 5,521,371
DATED : May 28, 1996
INVENTOR(S) : Yoshihiko HOTTA, et al.

It is certified that error appears in the above-identified patent and that said Letters Patent is hereby corrected as shown below:

Column 2, line 6, "imgewise" should read --imagewise--.

Column 3, line 56, "FIG. 1(b)" should read -- FIG. 1(a)--.

Column 7, line 44, "This is because the the" should read
--This is because the--.

Column 8, line 56, "medium of the present present" should read
--medium of the present--.

Column 18, line 58, "resin matrix and an low" should read
--resin matrix and a low--.

Signed and Sealed this

Second Day of December,1997

Attest:

*Attesting Officer*

BRUCE LEHMAN

*Commissioner of Patents and Trademarks*